United States Patent
Umetani et al.

[11] Patent Number: 5,171,348
[45] Date of Patent: Dec. 15, 1992

[54] DIE FOR PRESS-MOLDING OPTICAL ELEMENT

[75] Inventors: Makoto Umetani, Izumi; Hideto Monji, Osaka; Masaaki Sunohara, Nishinomiya; Jun Murata, Yao; Toshiaki Takano, Moriguchi; Yoshinori Shirafuzi, Soraku; Yoshio Inoue, Katano; Kiyoshi Kuribayashi, Kitatsuru, all of Japan

[73] Assignee: Matsushita Electric Industrial Co., Ltd., Osaka, Japan

[21] Appl. No.: 785,756

[22] Filed: Oct. 31, 1991

Related U.S. Application Data

[63] Continuation-in-part of Ser. No. 541,492, Jun. 20, 1990, abandoned.

[30] Foreign Application Priority Data

Jun. 20, 1989 [JP] Japan ................................. 1-157788
Oct. 31, 1990 [JP] Japan ................................. 2-295730

[51] Int. Cl.⁵ ............................................. C03B 5/18
[52] U.S. Cl. ................................. 65/374.11; 65/26; 65/374.12; 65/36
[58] Field of Search ............ 65/26, 36, 374.11, 374.12; 249/116

[56] References Cited

U.S. PATENT DOCUMENTS

| | | | |
|---|---|---|---|
| 4,168,961 | 9/1979 | Blair | 65/66 |
| 4,251,254 | 2/1981 | Klomp et al. | 65/374.11 X |
| 4,629,487 | 12/1986 | Monji et al. | 65/26 |
| 4,685,948 | 8/1987 | Kuribayashi et al. | 65/374.11 X |

FOREIGN PATENT DOCUMENTS

| | | |
|---|---|---|
| 0191618 | 2/1986 | European Pat. Off. |
| 52-45613 | 4/1977 | Japan. |
| 59-121126 | 7/1984 | Japan. |
| 60-140824 | 7/1985 | Japan. |
| 62-28091 | 6/1987 | Japan. |

*Primary Examiner*—Robert L. Lindsay
*Attorney, Agent, or Firm*—Wenderoth, Lind & Ponack

[57] ABSTRACT

A die for press-molding an optical element with high precision comprises a base material made of a material excellent in heat resistance, heat shock resistance and mechanical strength at high temperature, an intermediate layer formed on the base material and made of a thin film excellent in grinding machinability and cutting machinability, and a surface protective layer formed on the intermediate layer and made of a metal thin film excellent in heat resistance and mechanical strength at high temperature and less reactive to a material of the optical element. Additional thin film may be inserted between the base material and the intermediate layer so as to enhance the adhesion strength between the base material and the intermediate layer. In place of the additional thin film to be inserted, a peripheral flange part of the intermediate layer is removed and thus on the removed peripheral part, the surface protective layer is directly adhered to the base material.

26 Claims, 4 Drawing Sheets

DIE FOR PRESS-MOLDING OPTICAL ELEMENT

This application is a continuation-in-part of copending application, Ser. No. 07/541,492 filed Jun. 20, 1990 now abandoned.

BACKGROUND OF THE INVENTION

1. Field of the Invention

The present invention relates to a die for pressmolding optical elements with high precision at low cost and also preferably provided with improved durability and a method for preparing the same.

2. Description of the Prior Art

When manufacturing an optical element such as an aspherical glass lens with high precision, hitherto, the glass was directly ground and machined by a machine with extremely high performance. In such conventional method, it took a very long time to manufacture each lens, and so it was not suited to mass production.

Recently, as a method of manufacturing optical elements with high precision in quantities and at low cost, the press-molding method has been noticed, and variously devised. To mold optical elements with high precision by press-molding, durable dies with high precision are needed. In other words, the press-molding die for optical elements must be stable both thermally and chemically at high temperature, resistant to oxidation, inert to materials of the optical element, and excellent in mechanical strength so that the die shape may not be deformed during press-molding. To the contrary, the die must be excellent in machinability so as to be machined precisely and easily.

Conventionally, as the die material satisfying to a certain extent the above mentioned necessary conditions, silicon carbide (SiC) and silicon nitride ($Si_3N_4$) as disclosed in Japanese Laid-open Patent No. 52-45613 have been used. Besides, titanium carbide (TiC) mixed with metals as disclosed in Japanese Laid-open Patent No. 59-121126 may be considered also as the die material. The dies made of such materials are high in strength, but these materials are likely to react with lead (Pb) or alkali components contained in the optical elements, and so the dies may be adhered to the optical elements after several times of press-moldings, and become unusable. Besides, since these dies are very hard, or excellent in mechanical strength, the diamond tool used for machining the dies is worn out quickly, which makes it difficult to machine the dies precisely.

Figure 1:
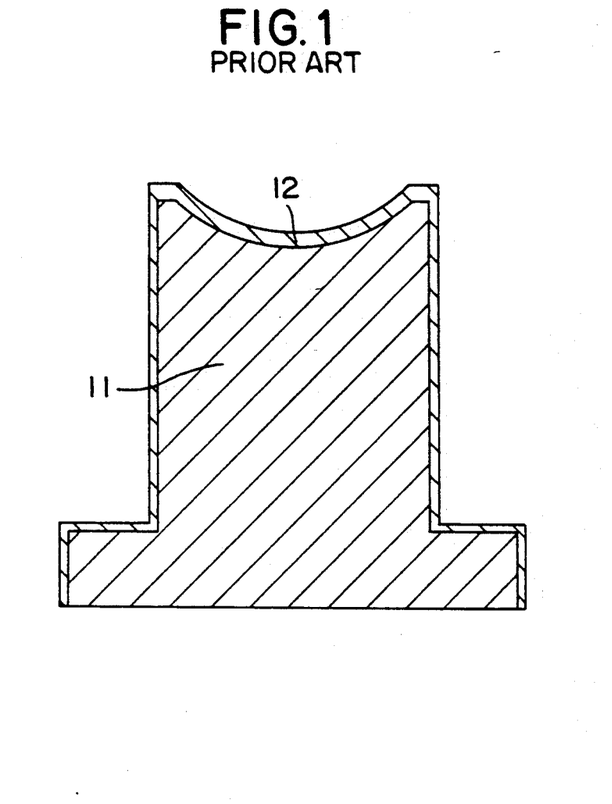
FIG. 1 and FIG. 2 are schematic diagrams showing sectional views of conventional press-molding dies for optical elements.

More recently, it has come to be possible to mass-produce optical elements by press-molding, using the press-molding die as disclosed in Japanese Patent Publication No. 62-28091 as shown in FIG. 1. This die is composed of a base material 11 which is precisely machined to an inverted shape of an optical element, and a surface protective layer 12 which is formed on the base material 11 so as not to spoil the surface shape of the base material. The die base material 11 is made of a cemented carbide mainly composed of WC which is excellent in heat resistance and mechanical strength, so as to maintain the strength of the die. The press surface of the base material 11 is precisely machined to the inverted shape of the optical element. The base material 11 is coated with a platinum alloy thin firm as the surface protective layer 12 which is thermally and chemically stable at high temperature, resistant to oxidation, inert to the optical element material, and excellent in mechanical strength so as not to deform the die shape during press-molding. It is intended to press-mold the optical elements repeatedly. It is intended to press-mold the optical elements repeatedly. In this die, however, since it took a long time to precisely machine the base material 11 made of the cemented carbide mainly composed of WC, so that the die manufacturing cost was very high, and the optical elements could not be mass-produced at low cost.

Figure 2:
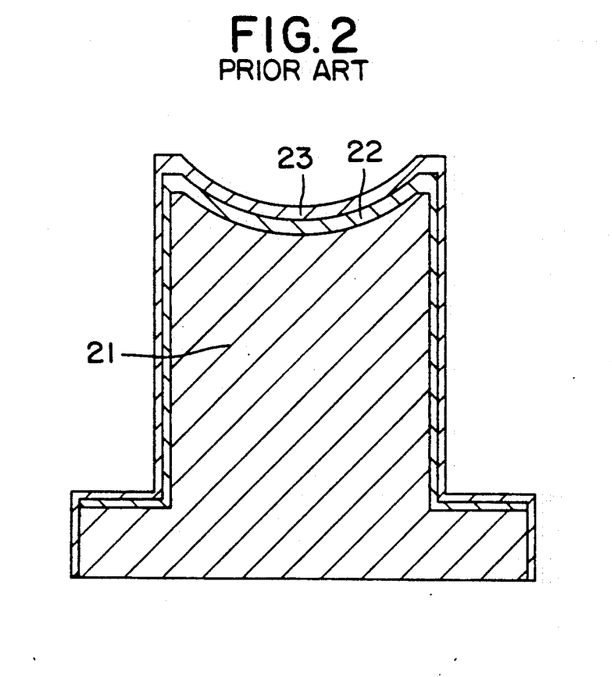

A new die as shown in FIG. 2 is proposed hence in order to greatly shorten the die machining time as disclosed in Japanese Patent Application No. 60-140824. This die is composed of a base material 21 roughly machined to an inverted shape of an optical element, an intermediate layer 22 precisely machined on the base material 21, and a surface protective layer 23 formed so as not to spoil the surface shape of the intermediate 22. The die base material 21 is made of tungsten carbide, zirconia, cermet, silicon nitride or silicon carbide excellent in heat resistance and mechanical strength in order to maintain the strength of the die. The press surface of the base material 21 is roughly machined to the inverted shape of the optical element. A gold, copper, nickel of platinum-gold, platinum-copper, or platinum-nickel alloy thin film with the platinum content of 60 wt. % or less excellent in cutting processability and grinding processability is formed on the base material 21 as the intermediate layer 22. The intermediate layer 22 is precisely machined to the inverted shape of the optical element, and then coated with the surface protective layer 23 which is a platinum alloy thin film that is stable thermally and chemically at high temperature, resistant to oxidation, inert to optical element materials, and excellent in mechanical strength. Therefore, the optical elements can be press-molded repeatedly, while the die machining time is shortened remarkably. Therefore, by using this die, optical elements with higher precision can be mass-produced at lower cost. In this die, however, when the press-molding operation is repeated many time, the intermediate layer 22 is separated from the base material 21 because the adhesion between the base material 21 and the intermediate layer 22 is not so strong, so that a large number of optical elements cannot be press-molded by one die. Therefore, in order to realize manufacturing of optical elements with higher precision at lower cost, it is essentially required to further reduce the die machining time. In a case of using a material excellent in grinding machinability and cutting machinability as the intermediate layer, the adhesion strength between the base material and the intermediate layer is not sufficient for durability of the die, that is, stress concentration in the intermediate layer and repeating of expansion-shrikage caused by the molding temperature cycle make the intermediate layer, adhered to the base material, tend to be peeled off and be cracked. Therefore, in order to realize manufacturing of optical elements with higher precision at furthermore lower cost, it is also essentially required to enhance the adhesion strength between the base material and the intermediate layer thereby to improve the durability of the die.

SUMMARY OF THE INVENTION

It is hence a primary object of the invention to provide a press-molding die for producing optical elements with high precision in large quantity and at low cost.

To achieve the above object, according to the first aspect of the invention, there is provided for press-molding an optical element with high precision, a press-molding die comprises: a base material made of a material excellent in heat resistance, heat shock resistance and strength at high temperature; an intermediate layer made of a Ni-P or Ni-B alloy thin film excellent in grinding processability and cutting processability, formed on the base material, and precisely machined into a desired shape; and a surface protective layer made of a metal thin film stable both thermally and chemically at high temperature, resistant to oxidation, inert to optical element materials, and excellent in mechanical strength so as not to deform the die shape during press-molding.

In the die, the base material may comprise a cemented carbide mainly composed of WC or a cermet mainly composed of TiN, TiC, $Al_2O_3$ or $Cr_3C_2$. The surface protective layer may be a metal thin film comprising at least one member selected from the group consisting of Pt, Pd, Ir, Rh, Os, Ru, Re, W and Ta. The intermediate layer may be a Ni-P alloy or Ni-B alloy thin film with a Ni content of 90 wt. %, more or less.

In this constitution, the machining time for producing the die can be further shortened, and by press-molding using this die, optical elements with high precision can be mass-produced at low cost.

From the second aspect of the invention, there is provided for press-molding an optical element with high precision, a press-molding die comprising: a base material made of a material excellent in heat resistance, heat shock resistance and strength at high temperature; a thin film of metal, carbide, nitride or oxide formed on the base material in order to enhance the adhesion strength between the base material and an intermediate layer; the intermediate layer made of a material excellent in grinding processability and cutting processability, formed on the thin film and precisely machined into a desired shape; and a surface protective layer made of a metal thin film stable both thermally and chemically at high temperature, resistant to oxidation, inert to optical element materials, and excellent in mechanical strength so as not to deform the die shape during press-molding.

In the die, the base material comprises a cemented carbide mainly composed of WC or a cermet mainly composed of TiN, TiC, $Al_2O_3$ or $Cr_3C_2$. The thin film for enhancing the adhesion strength between the base material and the intermediate layer comprises a metal, carbide, nitride or oxide thin film. The surface protective layer is a metal thin film comprising at least one member selected from the group consisting of Pt, Pd, Ir, Rh, Os, Ru, Re, W and Ta. The intermediate layer comprises a Pt-Au alloy, Pt-Cu alloy or Pt-Ni alloy thin film with a Pt content of 60 wt. % or less or a Ni-P alloy or Ni-B alloy thin film with a Ni content of 90 wt. %, more or less.

In this constitution, the die can be easily machined precisely, and the durability of the die is enhanced at the same time, because the adhesion strength between the base material and the intermediate layer is enhanced by inserting the thin film therebetween. Therefore, by press-molding using this die, optical elements with high precision may be mass-produced at low cost.

From the third aspect of the invention, there is furthermore provided a press-molding die comprising: a base material made of a material excellent in heat resistance, heat shock resistance and strength at high temperature; an intermediate layer made of a material excellent in grinding processability and cutting processability, formed on a press-molding part of the base material and precisely machined into a desired shape; and a surface protective layer, formed on a press-molding part of the intermediate layer and the peripheral flange part of the base material, made of a metal thin film stable both thermally and chemically at high temperature, resistant to oxidation, inert to optical element materials, and excellent in mechanical strength so as not to deform the die shape during press-molding.

In the die, the base material may comprise a cemented carbide mainly composed of WC or a cermet mainly composed of TiN, TiC, $Al_2O_3$ or $Cr_3C_2$. The surface protective layer may be a metal thin film comprising at least one member selected from the group consisting of Pt, Pd, Ir, Rh, Os, Ru, Re, W and Ta, especially it may be preferred to be selected from the group consisting of an Ir-W alloy, a Ru-W alloy, an Ir-Ta alloy, a Ru-W alloy, an Ir-Ta alloy, a Ru-Ta alloy, an Ir-Re alloy and Ru-Re alloy. The surface protective layer may be a metal thin film comprising a metal nitride, a metal carbide or a metal boride.

The intermediate layer may comprise a Pt-Au alloy, Pt-Cu alloy or Pt-Ni alloy thin film with a Pt content of 60 wt. % or less or may comprise a Ni metal or Ni alloy made of or mainly composed of Ni-P alloy or Ni-B alloy.

The die is provided with a press-molding part and a peripheral flange part which is positioned on the outside of the press-molding part and can be prepared by the following step;

(a) roughly machining a base material made of a material excellent in heat resistance, heat impact resistance and strength at high temperature into a shape approximated to the desired shape of the die;

(b) forming an intermediate thin layer made of a Ni, Cu, Au, Pt, Pt-Au, Pt-Cu, Pt-Ni, Ni-P or Ni-B alloy excellent in grinding machinability and cutting machinability on the base materials;

(c) precisely machining the intermediate layer into a desired shape of the die;

(d) removing the peripheral flange part of the intermediate layer at the same time of the step (c) or thereafter;

(e) forming a surface protective layer made of a metal thin film excellent in heat resistance and strength at high temperature and less reactive to a material of the optical element, on the press-molding part of the intermediate layer and the peripheral flange part of the base material in an uniform manner not to deform the desired shape precision.

In this constitution, the die can be easily machined precisely, and the durability of the die is enhanced at the same time, because the surface protective layer is adhered directly to the peripheral flange part of the base material thereby to release stress concentration and so on from the intermediate layer. Therefore, by press-molding using this die, optical elements with high precision may be mass-produced at low cost.

BRIEF DESCRIPTION OF THE DRAWINGS

FIG. 6a–e is a process diagram showing the steps of preparing a press-molding die according to a third embodiment of the invention.

DESCRIPTION OF THE PREFERRED EMBODIMENTS

Hitherto, a lens system was composed by combining several spherical lenses in order to correct various aberrations of each spherical lens. On the other hand, an aspherical lens is used in the lens system, the number of lenses can be notably decreased.

The aspherical lenses were so far manufactured by directly machining the lens material by a machine with a very high performance, so that it took a very long time in machining, and so mass production of the aspherical lenses was impossible.

The present invention, in this background, presents a press-molding die which can be machined easily and precisely, and which makes it possible to mass-product aspherical glass lenses by press-molding.

Referring now to the drawings, preferred embodiments of the invention are described in detail below.

Embodiment 1

Figure 3:
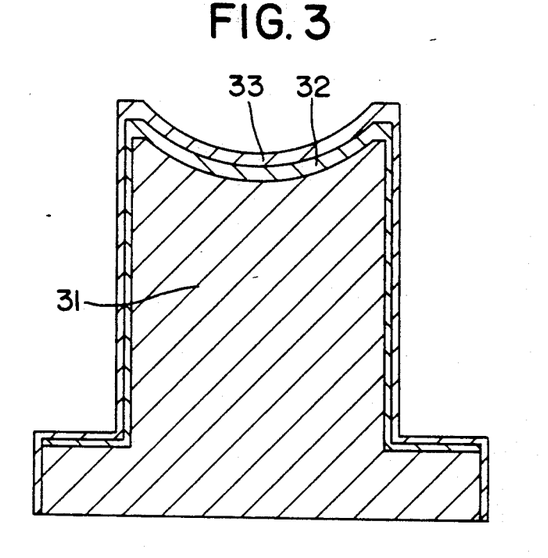
FIG. 3 is a schematic diagram showing a sectional structure of a press-molding die for optical elements capable of being easily machined precisely according to the invention.

A schematic diagram of sectional structure of a press-molding die for optical elements in an embodiment of the invention is shown in FIG. 3, in which numeral 31 is a roughly machined base material, 32 is an intermediate layer which is a precisely machined NiP or NiB alloy thin film, and 33 is a surface protective layer.

The base material 31 is made of a cermet mainly composed of titanium nitride (TiN), titanium carbide (TiC), alumina ($Al_2O_3$), or chromium carbide ($Cr_3C_2$), or a cemented carbide mainly composed of tungsten carbide (WC), in a columnar form of 20 mm in diameter and 6 mm in thickness. These materials are excellent in heat resistance, heat shock resistance and mechanical strength at high temperature. The base material was roughly machined into a shape of each of a pair of upper and lower dies with concave shapes having the curvature radius of 46 mm and 200 mm, respectively.

On the surface of the base material 31, a thin film of platinum (Pt), gold (Au), copper (Cu) or nickel (Ni) or a thin film of Pt-Au, Pt-Cu, Pt-Ni, nickel-phosphorus (Ni-P) or nickel-boron (Ni-B) alloy was formed as the intermediate layer 32 for precision machining. The thin film was deposited by sputtering method or electroless plating method to be a thickness of about 5 μm.

The machining time required for precision machining the die, the shape precision and surface roughness of the die are summarized in Table 1. The manufacturing cost of each die assuming the direct precision machining of the base material 31 without forming the intermediate layer 32 to be 100% is also shown in Table 1.

In Table 1, (a), (b), (c), (d) and (e) denote the machinability of the intermediate layer 32 of the die whose base material 31 is made of a cermet mainly composed of TiN, a cermet mainly composed of TiC, a cermet mainly composed of $Al_2O_3$, a cermet mainly composed of $Cr_3C_2$, and a cemented carbide mainly composed of WC, respectively.

TABLE 1

| Intermediate layer | | Die Machinability | | | |
|---|---|---|---|---|---|
| | | Machining time | Shape precision (rms) | Surface roughness (rms) | Cost |
| (a) Die with the base material made of cermet mainly composed of TiN | | | | | |
| None | | 40 hr | 0.05 λ | 40 Å | 100% |
| Pt | | 12 | 0.04 | 30 | 35 |
| Au | | 4 | 0.02 | 25 | 13 |
| Cu | | 4 | 0.02 | 25 | 13 |
| Ni | | 5 | 0.02 | 25 | 15 |
| Pt—Au | 20 wt. % Pt | 4.5 | 0.02 | 25 | 14 |
| | 60 wt. % Pt | 6 | 0.02 | 25 | 18 |
| | 70 wt. % Pt | 9 | 0.04 | 30 | 25 |
| Pt—Cu | 20 wt. % Pt | 5 | 0.02 | 25 | 15 |
| | 60 wt. % Pt | 6 | 0.02 | 25 | 18 |
| | 70 wt. % Pt | 9 | 0.04 | 30 | 25 |
| Pt—Ni | 20 wt. % Pt | 5 | 0.02 | 25 | 15 |
| | 60 wt. % Pt | 6 | 0.02 | 25 | 18 |
| | 70 wt. % Pt | 10 | 0.04 | 30 | 30 |
| Ni—P (5 wt. % P) | | 4 | 0.02 | 25 | 13 |
| Ni—P (10 wt. % P) | | 2 | 0.01 | 20 | 10 |
| Ni—B (5 wt. % B) | | 4 | 0.02 | 25 | 13 |
| Ni—B (10 wt. % B) | | 2 | 0.01 | 20 | 10 |
| (b) Die with the base material made of cermet mainly composed of TiC | | | | | |
| None | | 40 hr | 0.05 λ | 40 Å | 100% |
| Pt | | 12 | 0.04 | 30 | 35 |
| Au | | 4 | 0.02 | 25 | 13 |
| Cu | | 4 | 0.02 | 25 | 13 |
| Ni | | 5 | 0.02 | 25 | 15 |
| Pt—Au | 20 wt. % Pt | 4.5 | 0.02 | 25 | 14 |
| | 60 wt. % Pt | 6 | 0.02 | 25 | 18 |
| | 70 wt. % Pt | 9 | 0.04 | 30 | 25 |
| Pt—Cu | 20 wt. % Pt | 5 | 0.02 | 25 | 15 |
| | 60 wt. % Pt | 6 | 0.02 | 25 | 18 |
| | 70 wt. % Pt | 9 | 0.04 | 30 | 25 |
| Pt—Ni | 20 wt. % Pt | 5 | 0.02 | 25 | 15 |
| | 60 wt. % Pt | 6 | 0.02 | 25 | 18 |
| | 70 wt. % Pt | 10 | 0.04 | 30 | 30 |
| Ni—P (5 wt. % P) | | 4 | 0.02 | 25 | 13 |
| Ni—P (10 wt. % P) | | 2 | 0.01 | 20 | 10 |
| Ni—B (5 wt. % B) | | 4 | 0.02 | 25 | 13 |
| Ni—B (10 wt. % B) | | 2 | 0.01 | 20 | 10 |
| (c) Die with the base material made of cermet mainly composed of $Al_2O_3$ | | | | | |
| None | | 60 hr | 0.08 λ | 70 Å | 100% |
| Pt | | 12 | 0.04 | 30 | 25 |
| Au | | 4 | 0.02 | 25 | 10 |
| Cu | | 4 | 0.02 | 25 | 10 |
| Ni | | 5 | 0.02 | 25 | 12 |
| Pt—Au | 20 wt. % Pt | 4.5 | 0.02 | 25 | 11 |
| | 60 wt. % Pt | 6 | 0.02 | 25 | 15 |
| | 70 wt. % Pt | 9 | 0.04 | 30 | 20 |
| Pt—Cu | 20 wt. % Pt | 5 | 0.02 | 25 | 12 |
| | 60 wt. % Pt | 6 | 0.02 | 25 | 15 |
| | 70 wt. % Pt | 9 | 0.04 | 30 | 20 |
| Pt—Ni | 20 wt. % Pt | 5 | 0.02 | 25 | 12 |
| | 60 wt. % Pt | 6 | 0.02 | 25 | 15 |
| | 70 wt. % Pt | 10 | 0.04 | 30 | 23 |
| Ni—P (5 wt. % P) | | 4 | 0.02 | 25 | 10 |
| Ni—P (10 wt. % P) | | 2 | 0.01 | 20 | 7 |
| Ni—B (5 wt. % B) | | 4 | 0.02 | 25 | 10 |
| Ni—B (10 wt. % B) | | 2 | 0.01 | 20 | 7 |
| (d) Die with the base material made of cermet mainly composed of $Cr_3C_2$ | | | | | |
| None | | 60 hr | 0.08 λ | 70 Å | 100% |
| Pt | | 12 | 0.04 | 30 | 25 |
| Au | | 4 | 0.02 | 25 | 10 |
| Cu | | 4 | 0.02 | 25 | 10 |
| Ni | | 5 | 0.02 | 25 | 12 |
| Pt—Au | 20 wt. % Pt | 4.5 | 0.02 | 25 | 11 |
| | 60 wt. % Pt | 6 | 0.02 | 25 | 15 |
| | 70 wt. % Pt | 9 | 0.04 | 30 | 20 |
| Pt—Cu | 20 wt. % Pt | 5 | 0.02 | 25 | 12 |
| | 60 wt. % Pt | 6 | 0.02 | 25 | 15 |
| | 70 wt. % Pt | 9 | 0.04 | 30 | 20 |
| | 20 wt. % Pt | 5 | 0.02 | 25 | 12 |
| Pt—Ni | 60 wt. % Pt | 6 | 0.02 | 25 | 15 |

TABLE 1-continued

| | Die Machinability | | | |
|---|---|---|---|---|
| Intermediate layer | Machining time | Shape precision (rms) | Surface roughness (rms) | Cost |
| 70 wt. % Pt | 10 | 0.04 | 30 | 23 |
| Ni—P (5 wt. % P) | 4 | 0.02 | 25 | 10 |
| Ni—P (10 wt. % P) | 2 | 0.01 | 20 | 7 |
| Ni—B (5 wt. % B) | 4 | 0.02 | 25 | 10 |
| Ni—B (10 wt. % B) | 2 | 0.01 | 20 | 7 |
| (e) Die with the base material made of cermet mainly composed of WC | | | | |
| None | 40 hr | 0.05 λ | 40 Å | 100% |
| Pt | 12 | 0.04 | 30 | 35 |
| Au | 4 | 0.02 | 25 | 13 |
| Cu | 4 | 0.02 | 25 | 13 |
| Ni | 5 | 0.02 | 25 | 15 |
| Pt—Au 20 wt. % Pt | 4.5 | 0.02 | 25 | 14 |
| 60 wt. % Pt | 6 | 0.02 | 25 | 18 |
| 70 wt. % Pt | 9 | 0.04 | 30 | 25 |
| Pt—Cu 20 wt. % Pt | 5 | 0.02 | 25 | 15 |
| 60 wt. % Pt | 6 | 0.02 | 25 | 18 |
| 70 wt. % Pt | 9 | 0.04 | 30 | 25 |
| Pt—Ni 20 wt. % Pt | 5 | 0.02 | 25 | 15 |
| 60 wt. % Pt | 6 | 0.02 | 25 | 18 |
| 70 wt. % Pt | 10 | 0.04 | 30 | 30 |
| Ni—P (5 wt. % P) | 4 | 0.02 | 25 | 13 |
| Ni—P (10 wt. % P) | 2 | 0.01 | 20 | 10 |
| Ni—B (5 wt. % B) | 4 | 0.02 | 25 | 13 |
| Ni—B (10 wt. % B) | 2 | 0.01 | 20 | 10 |

(measured at λ = 633 nm)

In Table 1, the machining time means the time required for precision machining, and the shape precision and surface roughness were measured for dies each having the best surface condition. As evident from Table 1, regardless of the material of the base material 31, the machining time required for precision machining of the intermediate layer 32 is constant. The machining time depends on the material of the intermediate layer 32. The die manufacturing cost does not depend on the cost of the material of the intermediate layer 32 or the die structure, but it is proportional to the precision machining time. Consequently, the manufacturing cost is reduced when a material of better machinability is used for the intermediate layer 32. When Pt, Au, Cu, Ni, Pt-Au, Pt-Cu or Pt-Ni was used for the intermediate layer 32, the die manufacturing cost is 35% or less as compared with that of the die without the intermediate layer 32. In the best case, when Au or Cu was used for the intermediate layer 32, the manufacturing cost is 10% or 13% as compared with that of the die without the intermediate layer 32, and a notable cost reduction is realized. However, when Au or Cu is used for the intermediate layer 32, since Au or Cu is not excellent in the mechanical strength, the machined surface may be easily damage and the shape precision may be degraded unless handled very carefully after precision machining. Furthermore, although the rate of the cost of the intermediate layer material to the total die manufacturing cost does not differ so much depending on the material, the material cost of the intermediate layer should be considered in mass production of dies. Therefore, the material for the intermediate layer 32 is desired to be easy to be machined precisely and as inexpensive as possible.

As shown in Table 1, in the case of the die having Ni-P or Ni-B intermediate layer 32, the precision machining time is at most 4 hours, and the shape precision of 0.02λ or less and the surface roughness of 25Å or less can be obtained. Also, the die manufacturing cost is 7% to 13% as compared with that of the die without intermediate layer 32. This means that the die manufacturing cost can be further reduced as compared with that of the die having Au or Cu intermediate layer 32.

Incidentally, Ni-P or Ni-B has the micro Vickers hardness in the range from 500 Hv to 1000 Hv as shown in Table 2, so that the mechanical strength of NiP or NiB is considerably higher as compared with Au or Cu. In other words, the Ni-P or Ni-B film is more resistant to scratches than Au or Cu. Accordingly, the shape precision of the precision machined surface is hardly degraded by press-molding.

TABLE 2

| Hardness of Intermediate layer | |
|---|---|
| Intermediate layer material | Micro Vickers hardness (Hv) |
| Au | 50 or less |
| Cu | 50–100 |
| Ni—P | 500–1000 |
| Ni—B | 500–1000 |

Below are explained the results of press-molding using the dies manufactured in the above-described manner.

Figure 4:
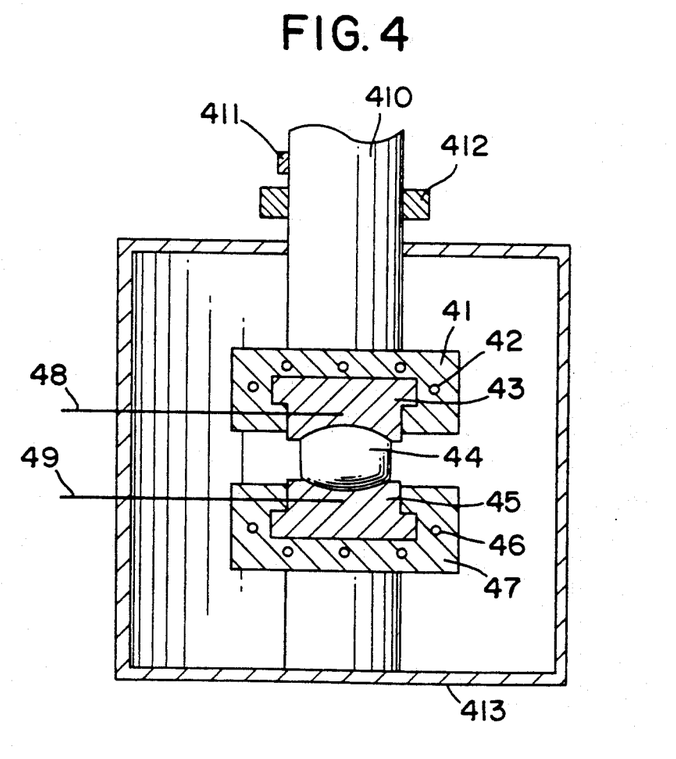
FIG. 4 is a schematic diagram of a press-molding machine used in an embodiment.

A schematic diagram of a machine used for press-molding is shown in FIG. 4. The press-molding machine has an upper fixing block 41 and a lower fixing block 47 within a covering 413 for shutting off ambient air and controlling the atmosphere within the machine. An upper die 43 is fixed to the upper fixing block 41 and 47, respectively. The temperature of the dies 43, 45 is measured by thermocouples 48, 49 inserted in the respective dies, and controlled according to the measured results. For pressurization, only the upper fixing block 41 is pressed from the above by a plunger 410 until reaching the position preset in a positioning sensor 411.

First of all, a spherical glass 44 with the radius of 10 mm composed of 70 wt. % of lead oxide (PbO), 27 wt. % of silica (SiO) and the rest of traces was put on the lower die 45, and the upper die 43 fixed to the upper fixing block 41 was put thereon. After the die temperature was raised to 520° C., the spherical glass 44 was pressed between the upper and lower dies for 2 minutes with a pressing pressure of about 40 kg/cm² in nitrogen atmosphere. Thereafter, the upper and lower dies were cooled to 300° C., and the press-mold aspherical glass lens was taken out of the die. After repeating this process 10,000 times, the upper die 43 was taken out of the press-molding machine, and the surface roughness (rms, Å) of the die and the die precision were measured.

The press test results are shown in Table 3. This table shows the initial shape precision and initial surface roughness of each die right after manufactured, and the shape precision and surface roughness of each die after 10,000 times of press-moldings. In Table 3, (a), (b), (c), (d), and (e) refer to the press test results by changing the material of the intermediate layer 32 of the dies whose base materials are made of cermet mainly composed of TiN, a cermet mainly composed of TiC, a cermet mainly composed of Al₂O₃, a cermet mainly composed of Cr₃C₂, and a cemented carbide mainly composed of WC, respectively.

TABLE 3

Press Test Results

| Intermediate layer | | Initial shape precision (rms) | Initial surface roughness (rms) | Shape precision after pressing (rms) | Surface roughness after pressing (rms) |
|---|---|---|---|---|---|
| (a) Die with the base material made of cermet mainly composed of TiN ||||||
| None | | 0.05 λ | 40 Å | 0.05 λ | 40 Å |
| Pt | | 0.04 | 30 | 0.04 | 30 |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P | (5 wt. % P) | 0.02 | 25 | 0.02 | 25 |
| Ni—P | (10 wt. % P) | 0.01 | 20 | 0.01 | 20 |
| Ni—B | (5 wt. % B) | 0.02 | 25 | 0.02 | 25 |
| Ni—B | (10 wt. % B) | 0.01 | 20 | 0.01 | 20 |
| (b) Die with the base material made of cermet mainly composed of TiC ||||||
| None | | 0.05 λ | 40 Å | 0.05 λ | 40 Å |
| Pt | | 0.04 | 30 | 0.04 | 30 |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P | (5 wt. % P) | 0.02 | 25 | 0.02 | 25 |
| Ni—P | (10 wt. % P) | 0.01 | 20 | 0.01 | 20 |
| Ni—B | (5 wt. % B) | 0.02 | 25 | 0.02 | 25 |
| Ni—B | (10 wt. % B) | 0.01 | 20 | 0.01 | 20 |
| (c) Die with the base material made of cermet mainly composed of $Al_2O_3$ ||||||
| None | | 0.05 λ | 40 Å | 0.05 λ | 40 Å |
| Pt | | 0.04 | 30 | 0.04 | 30 |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P | (5 wt. % P) | 0.02 | 25 | 0.02 | 25 |
| Ni—P | (10 wt. % P) | 0.01 | 20 | 0.01 | 20 |
| Ni—B | (5 wt. % B) | 0.02 | 25 | 0.02 | 25 |
| Ni—B | (10 wt. % B) | 0.01 | 20 | 0.01 | 20 |
| (d) Die with the base material made of cermet mainly composed of $Cr_3C_2$ ||||||
| None | | 0.05 λ | 40 Å | 0.05 λ | 40 Å |
| Pt | | 0.04 | 30 | 0.04 | 30 |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P | (5 wt. % P) | 0.02 | 25 | 0.02 | 25 |
| Ni—P | (10 wt. % P) | 0.01 | 20 | 0.01 | 20 |
| Ni—B | (5 wt. % B) | 0.02 | 25 | 0.02 | 25 |
| Ni—B | (10 wt. % B) | 0.01 | 20 | 0.01 | 20 |
| (e) Die with the base material made of cermet mainly composed of WC. ||||||
| None | | 0.05 λ | 40 Å | 0.05 λ | 40 Å |
| Pt | | 0.04 | 30 | 0.04 | 30 |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P | (5 wt. % P) | 0.02 | 25 | 0.02 | 25 |
| Ni—P | (10 wt. % P) | 0.01 | 20 | 0.01 | 20 |
| Ni—B | (5 wt. % B) | 0.02 | 25 | 0.02 | 25 |
| Ni—B | (10 wt. % B) | 0.01 | 20 | 0.01 | 20 |

(measured at λ = 633 nm)

As clear from Table 3, after 10,000 times of press-molding, all dies were free from roughness of the die surface, and were proved to have durability sufficient for mass production of optical elements. Therefore, the life of the die using the Ni-P or Ni-B film as the intermediate layer 32 is known to be almost the same as that of the die without the intermediate layer 32, or the die using the Pt, Au, Cu, Ni, Pt-Au, Pt-Cu or Pt-Ni film as the intermediate layer 32, that is, the conventional die shown in FIG. 1 or FIG. 2.

It is hence known that the die of the invention having the Ni-P or Ni-B intermediate layer 32 has the durability sufficient for mass production of optical elements, and is suitable for easy and precision machining, as compared with the conventional die having no intermediate layer or the conventional die having an intermediate layer made of Pt, Au, Cu, Ni, Pt-Au, Pt-Cu or Pt-Ni. Therefore, when the intermediate layer 32 is made of Ni-P or Ni-B, the die with high strength, superior durability and long life can be easily and inexpensively produced, and by press-molding using this die, optical elements with high precision can be mass-produced at lower cost.

However, as the number of press-molding operations increases, all dies were separated at the boundary of the base material 31 and the intermediate layer 32 until 20,000 times of press-moldings. The cause of this peeling was unsatisfactory adhesion between the base material 31 and the intermediate layer 32. It means that the bonding of the base material 31 and the intermediate layer 32 is not chemical but is physical. It is hence expected that the die life be extended by producing a die in such a structure as to have a thin film containing a chemical bond between the base material 31 and the intermediate layer 32.

Such modified embodiment is described as Embodiment 2 below.

Embodiment 2

Figure 5:
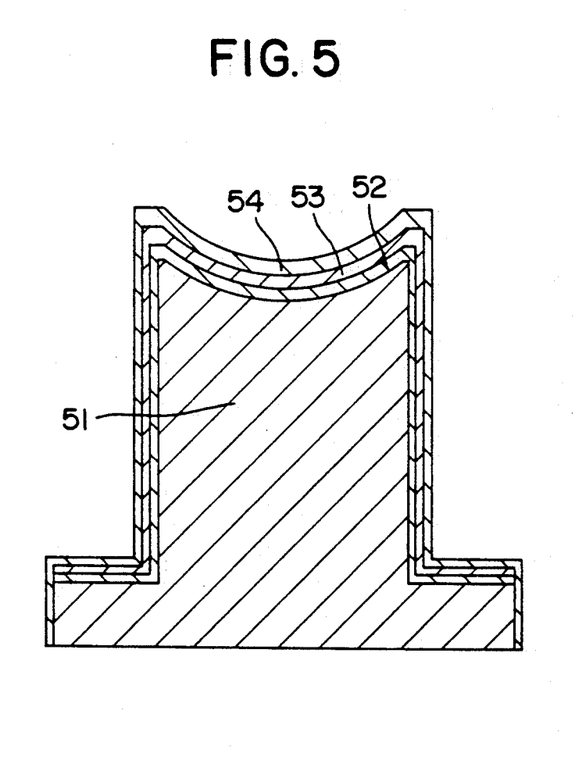
FIG. 5 is a schematic diagram showing a sectional structure of a press-molding die for optical elements capable of being easily machined precisely and further enhanced in the durability according to the invention.

FIG. 5 shows a sectional structural drawing of the die in a modified embodiment of the invention. The die comprises a roughly machined base material 51, a thin film 52 formed on the base material 51 for enhancing the adhesion strength between the base material and an intermediate layer, a precisely machined intermediate layer 53 formed on the thin film 52, and a surface protective layer 54 for protecting the entire die.

The base material 51 of the die is made of a cermet mainly composed of TiN, TiC, Al₂O₃ or Cr₃O₂, or a cemented carbide mainly composed of WC, in a columnar form of 20 mm in diameter and 6 mm in thickness. The base material 51 was roughly machined into each of a pair of upper and lower dies with the concave shape of 46 mm and 200 mm in curvature radius, respectively.

As the thin film 52 with an excellent adhesion to the base material 51, a thin film of nickel-cobalt (Ni-Co) alloy was formed on the roughly machined surface of the base material 51 in a thickness of about 1 μm by electro-plating method. The surface of the thin film 52 is almost the same in shape precision as the roughly machined surface of the base material 51.

In succession, as the intermediate layer 53 for precision machining, a thin film of Pt, Au, Cu, Ni or Pt-Au, Pt-Cu, Pt-Ni, Ni-P or Ni-B alloy was formed in a thickness of about 5 μm by sputtering or electroless plating method. Then, the intermediate layer 53 was machined precisely by a diamond tool into a desired shape.

Finally, as the surface protective layer 54, a thin film of platinum-rhodium-renium-tungsten (Pt-Rh-Re-W) alloy was formed in a thickness of about 3 μm on the precisely machined intermediate layer 53 so as not to deform the intermediate layer.

The machining time required for the precision machining, the die shape precision and surface roughness, and the manufacturing cost of each die assuming the manufacturing cost of the die obtained by direct precision machining of the base material 51 without forming the thin film 52 and the intermediate layer 53 to be 100% are summarized in Table 4.

In Table 4, (a), (b), (c), (d) and (e) refer to the machinability of the intermediate layer 53 of the dies whose base materials 51 are made of a cermet mainly composed of TiN, a cermet mainly composed of TiC, a cermet mainly composed of Al₂O₃, a cermet mainly composed of Cr₃O₂, and a cemented carbide mainly composed of WC, respectively.

TABLE 4

| Intermediate layer | | Machining time | Shape precision (rms) | Surface roughness (rms) | Cost |
|---|---|---|---|---|---|
| (a) Die with the base material made of cermet mainly composed of TiN ||||||
| None | | 40 hr | 0.05 λ | 40 Å | 100% |
| Pt | | 12 | 0.04 | 30 | 37 |
| Au | | 4 | 0.02 | 25 | 15 |
| Cu | | 4 | 0.02 | 25 | 15 |
| Ni | | 5 | 0.02 | 25 | 17 |
| Pt—Au | 20 wt. % Pt | 4.5 | 0.02 | 25 | 16 |
| | 60 wt. % Pt | 6 | 0.02 | 25 | 20 |
| | 70 wt. % Pt | 9 | 0.04 | 30 | 27 |
| Pt—Cu | 20 wt. % Pt | 5 | 0.02 | 25 | 17 |
| | 60 wt. % Pt | 6 | 0.02 | 25 | 20 |
| | 70 wt. % Pt | 9 | 0.04 | 30 | 27 |
| Pt—Ni | 20 wt. % Pt | 5 | 0.02 | 25 | 17 |
| | 60 wt. % Pt | 6 | 0.02 | 25 | 20 |
| | 70 wt. % Pt | 10 | 0.04 | 30 | 32 |
| Ni—P | (5 wt. % P) | 4 | 0.02 | 25 | 15 |
| Ni—P | (10 wt. % P) | 2 | 0.01 | 20 | 12 |
| Ni—B | (5 wt. % B) | 4 | 0.02 | 25 | 15 |
| Ni—B | (10 wt. % B) | 2 | 0.01 | 20 | 12 |
| (b) Die with the base material made of cermet mainly composed of TiC ||||||
| None | | 40 hr | 0.05 λ | 40 Å | 100% |
| Pt | | 12 | 0.04 | 30 | 37 |
| Au | | 4 | 0.02 | 25 | 15 |
| Cu | | 4 | 0.02 | 25 | 15 |
| Ni | | 5 | 0.02 | 25 | 17 |
| Pt—Au | 20 wt. % Pt | 4.5 | 0.02 | 25 | 16 |
| | 60 wt. % Pt | 6 | 0.02 | 25 | 20 |
| | 70 wt. % Pt | 9 | 0.04 | 30 | 27 |
| Pt—Cu | 20 wt. % Pt | 5 | 0.02 | 25 | 17 |
| | 60 wt. % Pt | 6 | 0.02 | 25 | 20 |
| | 70 wt. % Pt | 9 | 0.04 | 30 | 27 |
| Pt—Ni | 20 wt. % Pt | 5 | 0.02 | 25 | 17 |
| | 60 wt. % Pt | 6 | 0.02 | 25 | 20 |
| | 70 wt. % Pt | 10 | 0.04 | 30 | 32 |
| Ni—P | (5 wt. % P) | 4 | 0.02 | 25 | 15 |
| Ni—P | (10 wt. % P) | 2 | 0.01 | 20 | 12 |
| Ni—B | (5 wt. % B) | 4 | 0.02 | 25 | 15 |
| Ni—B | (10 wt. % B) | 2 | 0.01 | 20 | 12 |
| (c) Die with the base material made of cermet mainly composed of Al₂O₃ ||||||
| None | | 60 hr | 0.08 λ | 70 Å | 100% |
| Pt | | 12 | 0.04 | 30 | 27 |
| Au | | 4 | 0.02 | 25 | 12 |
| Cu | | 4 | 0.02 | 25 | 12 |
| Ni | | 5 | 0.02 | 25 | 14 |
| Pt—Au | 20 wt. % Pt | 4.5 | 0.02 | 25 | 13 |
| | 60 wt. % Pt | 6 | 0.02 | 25 | 17 |
| | 70 wt. % Pt | 9 | 0.04 | 30 | 22 |
| Pt—Cu | 20 wt. % Pt | 5 | 0.02 | 25 | 14 |
| | 60 wt. % Pt | 6 | 0.02 | 25 | 17 |
| | 70 wt. % Pt | 9 | 0.04 | 30 | 22 |
| Pt—Ni | 20 wt. % Pt | 5 | 0.02 | 25 | 14 |
| | 60 wt. % Pt | 6 | 0.02 | 25 | 17 |
| | 70 wt. % Pt | 10 | 0.04 | 30 | 25 |
| Ni—P | (5 wt. % P) | 4 | 0.02 | 25 | 12 |
| Ni—P | (10 wt. % P) | 2 | 0.01 | 20 | 9 |
| Ni—B | (5 wt. % B) | 4 | 0.02 | 25 | 12 |
| Ni—B | (10 wt. % B) | 2 | 0.01 | 20 | 9 |
| (d) Die with the base material made of cermet mainly composed of Cr₃C₂ ||||||
| None | | 60 hr | 0.08 λ | 70 Å | 100% |
| Pt | | 12 | 0.04 | 30 | 27 |
| Au | | 4 | 0.02 | 25 | 12 |
| Cu | | 4 | 0.02 | 25 | 12 |
| Ni | | 5 | 0.02 | 25 | 14 |
| Pt—Au | 20 wt. % Pt | 4.5 | 0.02 | 25 | 13 |
| | 60 wt. % Pt | 6 | 0.02 | 25 | 17 |
| | 70 wt. % Pt | 9 | 0.04 | 30 | 22 |
| Pt—Cu | 20 wt. % Pt | 5 | 0.02 | 25 | 14 |
| | 60 wt. % Pt | 6 | 0.02 | 25 | 17 |
| | 70 wt. % Pt | 9 | 0.04 | 30 | 22 |
| Pt—Ni | 20 wt. % Pt | 5 | 0.02 | 25 | 14 |
| | 60 wt. % Pt | 6 | 0.02 | 25 | 17 |
| | 70 wt. % Pt | 10 | 0.04 | 30 | 25 |
| Ni—P | (5 wt. % P) | 4 | 0.02 | 25 | 12 |
| Ni—P | (10 wt. % P) | 2 | 0.01 | 20 | 9 |
| Ni—B | (5 wt. % B) | 4 | 0.02 | 25 | 12 |
| Ni—B | (10 wt. % B) | 2 | 0.01 | 20 | 9 |
| (e) Die with the base material made of cermet mainly composed of WC. ||||||
| None | | 40 hr | 0.05 λ | 40 Å | 100% |
| Pt | | 12 | 0.04 | 30 | 37 |
| Au | | 4 | 0.02 | 25 | 15 |
| Cu | | 4 | 0.02 | 25 | 15 |
| Ni | | 5 | 0.02 | 25 | 17 |

TABLE 4-continued

|  | Die Machinability | | | |
| --- | --- | --- | --- | --- |
| Intermediate layer | Machining time | Shape precision (rms) | Surface roughness (rms) | Cost |
| 20 wt. % Pt | 4.5 | 0.02 | 25 | 16 |
| Pt—Au 60 wt. % Pt | 6 | 0.02 | 25 | 20 |
| 70 wt. % Pt | 9 | 0.04 | 30 | 27 |
| 20 wt. % Pt | 5 | 0.02 | 25 | 17 |
| Pt—Cu 60 wt. % Pt | 6 | 0.02 | 25 | 20 |
| 70 wt. % Pt | 9 | 0.04 | 30 | 27 |
| 20 wt. % Pt | 5 | 0.02 | 25 | 17 |
| Pt—Ni 60 wt. % Pt | 6 | 0.02 | 25 | 20 |
| 70 wt. % Pt | 10 | 0.04 | 30 | 32 |
| Ni—P (5 wt. % P) | 4 | 0.02 | 25 | 15 |
| Ni—P (10 wt. % P) | 2 | 0.01 | 20 | 12 |
| Ni—B (5 wt. % B) | 4 | 0.02 | 25 | 15 |
| Ni—B (10 wt. % B) | 2 | 0.01 | 20 | 12 |

(measured at $\lambda$ = 633 nm)

The machining time in Table 4 shows the time required for precision machining, and the shape precision and surface roughness are measured in the best surface conditions. As evident from Table 4, even if the base material 51 is changed, the machining time required for precision machining of the intermediate layer 53 remains constant depending on the material of the intermediate layer 53. The die manufacturing cost does not very so much depending on the material of the intermediate layer 53 or die structure, and it is known to be proportional to the machining time required for precision machining. That is, the die manufacturing cost is lower for the die made in shorter machining time. Therefore, the die manufacturing cost is smaller when Pt, Au, Cu, Ni, Pt-Au, Pt-Cu, Pt-Ni, Ni-P or Ni-B having an excellent machinability is used for the intermediate layer 53. It is known from Table 4 that the cost is 37% or less as compared with the conventional die obtained by direct precision machining of the base material 51 without forming the adhesion enhancing thin firm 52 and intermediate layer 53 for precision machining. Thus, the die of the invention can be manufactured at a very low cost. The best one is the die using Ni-P (10 wt.% P) or Ni-B (10 wt.% B) thin film as the intermediate layer 53, in which the manufacturing cost is only 9% to 12% of that of the conventional die obtained by direct precision machining of the base material 51 without forming the adhesion enhancing thin firm 52 and the intermediate layer 53 for precision machining.

The results of press-molding using the thus fabricated die are described below.

In the same way as in Embodiment 1, the upper and lower dies 43, 45 were mounted in the press-molding machine shown in FIG. 4, and a spherical glass 44 of 10 mm in radius composed of 70 wt.% of lead oxide (PbO), 27 wt.% of silica (SiO) and the rest of traces was placed on the lower die 45. The upper die 43 fixed to the upper fixing block 41 was put thereon. The temperature of the dies was raised to 520° C., and the glass 44 was pressed between the dies 43, 45 for 2 minutes with a press pressure of about 40 kg/cm² in a nitrogen atmosphere. Thereafter, the upper and lower dies were cooled to 300° C., and the press-formed aspherical glass lens was taken out of the die. By repeating this process, after finishing 30,000 times of press-molding operations, the upper die 43 was taken out of the press-molding machine, and the surface roughness (rms, Å) of the press surface was measured, and the die precision was evaluated.

The test results are shown in Table 5. The table shows the initial shape precision and initial surface roughness of each die right after manufactured, and the shape precision and surface roughness of each die after 30,000 times of press-moldings. In Table 5, (a), (b), (c), (d), (e) refer to the press test results by changing the material of the intermediate layer 53 of the dies whose base materials are made of a cermet mainly composed of TiN, a cermet mainly composed of TiC, a cermet mainly composed of $Al_2O_3$, a cermet mainly composed of $Cr_3C_2$, and a cemented carbide mainly composed of WC, respectively.

TABLE 5

| | Press Test Results | | | |
| --- | --- | --- | --- | --- |
| Intermediate layer | Initial shape precision (rms) | Initial surface roughness (rms) | Shape precision after pressing (rms) | Surface roughness after pressing (rms) |
| (a) Die with the base material made of cermet mainly composed of TiN | | | | |
| Pt | 0.04 $\lambda$ | 30 Å | 0.04 $\lambda$ | 30 Å |
| Au | 0.02 | 25 | 0.02 | 25 |
| Cu | 0.02 | 25 | 0.02 | 25 |
| Ni | 0.02 | 25 | 0.02 | 25 |
| 20 wt. % Pt | 0.02 | 25 | 0.02 | 25 |
| Pt—Au 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Cu 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Ni 60 wt. % Pt | 0.02 | 25 | 0.02 | 25 |
| 70 wt. % Pt | 0.04 | 30 | 0.04 | 30 |
| Ni—P (5 wt. % P) | 0.02 | 25 | 0.02 | 25 |
| Ni—P (10 wt. % P) | 0.01 | 20 | 0.01 | 20 |
| Ni—B (5 wt. % B) | 0.02 | 25 | 0.02 | 25 |
| Ni—B (10 wt. % B) | 0.01 | 20 | 0.01 | 20 |
| (b) Die with the base material made of cermet mainly composed of TiC | | | | |
| Pt | 0.04 $\lambda$ | 30 Å | 0.04 $\lambda$ | 30 Å |
| Au | 0.02 | 25 | 0.02 | 25 |
| Cu | 0.02 | 25 | 0.02 | 25 |
| Ni | 0.02 | 25 | 0.02 | 25 |
| 20 wt. % Pt | 0.02 | 25 | 0.02 | 25 |
| Pt—Au 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Cu 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Ni 60 wt. % Pt | 0.02 | 25 | 0.02 | 25 |
| 70 wt. % Pt | 0.04 | 30 | 0.04 | 30 |
| Ni—P (5 wt. % P) | 0.02 | 25 | 0.02 | 25 |
| Ni—P (10 wt. % P) | 0.01 | 20 | 0.01 | 20 |
| Ni—B (5 wt. % B) | 0.02 | 25 | 0.02 | 25 |
| Ni—B (10 wt. % B) | 0.01 | 20 | 0.01 | 20 |
| (c) Die with the base material made of cermet mainly composed of $Al_2O_3$ | | | | |
| Pt | 0.04 $\lambda$ | 30 Å | 0.04 $\lambda$ | 30 Å |
| Au | 0.02 | 25 | 0.02 | 25 |
| Cu | 0.02 | 25 | 0.02 | 25 |
| Ni | 0.02 | 25 | 0.02 | 25 |
| 20 wt. % Pt | 0.02 | 25 | 0.02 | 25 |
| Pt—Au 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Cu 60 wt. % Pt | 0.02 | 25 | 0.02 | 25 |
| 70 wt. % Pt | 0.04 | 30 | 0.04 | 30 |
| 20 wt. % Pt | 0.02 | 25 | 0.02 | 25 |
| Pt—Ni 60 wt. % Pt | 0.02 | 25 | 0.02 | 25 |
| 70 wt. % Pt | 0.04 | 30 | 0.04 | 30 |
| Ni—P (5 wt. % P) | 0.02 | 25 | 0.02 | 25 |
| Ni—P (10 wt. % P) | 0.01 | 20 | 0.01 | 20 |
| Ni—B (5 wt. % B) | 0.02 | 25 | 0.02 | 25 |
| Ni—B (10 wt. % B) | 0.01 | 20 | 0.01 | 20 |
| (d) Die with the base material made of cermet mainly | | | | |

TABLE 5-continued

Press Test Results

| Intermediate layer | | Initial shape precision (rms) | Initial surface roughness (rms) | Shape precision after pressing (rms) | Surface roughness after pressing (rms) |
|---|---|---|---|---|---|
| composed of Cr₃C₂ | | | | | |
| Pt | | 0.04 λ | 30 Å | 0.04 λ | 30 Å |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P (5 wt. % P) | | 0.02 | 25 | 0.02 | 25 |
| Ni—P (10 wt. % P) | | 0.01 | 20 | 0.01 | 20 |
| Ni—B (5 wt. % B) | | 0.02 | 25 | 0.02 | 25 |
| Ni—B (10 wt. % B) | | 0.01 | 20 | 0.01 | 20 |
| (e) Die with the base material made of cermet mainly composed of WC. | | | | | |
| Pt | | 0.04 λ | 30 Å | 0.04 λ | 30 Å |
| Au | | 0.02 | 25 | 0.02 | 25 |
| Cu | | 0.02 | 25 | 0.02 | 25 |
| Ni | | 0.02 | 25 | 0.02 | 25 |
| Pt—Au | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Cu | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Pt—Ni | 20 wt. % Pt | 0.02 | 25 | 0.02 | 25 |
| | 60 wt. % Pt | 0.02 | 25 | 0.02 | 25 |
| | 70 wt. % Pt | 0.04 | 30 | 0.04 | 30 |
| Ni—P (5 wt. % P) | | 0.02 | 25 | 0.02 | 25 |
| Ni—P (10 wt. % P) | | 0.01 | 20 | 0.01 | 20 |
| Ni—B (5 wt. % B) | | 0.02 | 25 | 0.02 | 25 |
| Ni—B (10 wt. % B) | | 0.01 | 20 | 0.01 | 20 |

(measured at λ = 633 nm)

As clear from Table 5, in each die, degradation of the die surface was not observed even after 30,000 times of press-moldings, and it is known that the die life was extended notably. When the thin firm 52 which is a Ni-Co alloy thin film is inserted between the base material 51 and the intermediate layer 53, the die life is at least about 3 times longer as compared with the die without the thin film 52.

Thus, the dies according to Embodiment 2 were extremely extended in the life, while the die manufacturing cost was almost the same as that of the conventional die without the thin film 52. Therefore, by press-molding using the die of the invention, optical elements can be manufactured at lower cost and in larger quantity.

Embodiment 3

Firstly, a test for machinability of materials used as the intermediate layer is carried out as follows.

In the test, each test piece is made up into a concave shape of 8 mm in diameter and 7.5 mm in radius of curvature. In some cases of using materials not to be machined such as a cemented carbide and so on, the materials are used as a base material and are subjected to roughly machining treatment to make a shape approximated to a desired shape and then form an intermediate layer so as to machine the layer into a desired shape. As a method for machining the material, there are carried out a cutting machining by means of diamond bite and a grinding machining by means of diamond grinding. A precision of the surface thus machined is measured by interferometer and evaluated. The test result is shown in Table 6.

Aparent from the Table 6, Ni metal, Ni-P alloy and Ni-B alloy are easy to be cutted and excellent in machining precision. On the contrary, the other materials are very difficult to be cutted because of their high hardness, so that diamond bite can be worn out instantly. Further, even in grinding machinery, there occurs abrasion of grinding similarly and grinding requires long times. After machined, sufficient surface shape can not be obtained.

TABLE 6

| Material | Machining time (min.) | Shape precision accuracy (λ) | | Machinability | |
|---|---|---|---|---|---|
| | | P—V | RMS | Grinding | Cutting |
| Ni | 8 | 0.120 | 0.120 | Good | Good |
| Ni—P | 12 | 0.143 | 0.150 | Good | Good |
| Ni—B | 12 | 0.134 | 0.014 | Good | Good |
| Cemented carbide | 66 | 0.360 | 0.052 | Difficult | Impossible |
| Cermet | 64 | 0.306 | 0.063 | Difficult | Impossible |
| Nitride titanium | 60 | 0.271 | 0.056 | Difficult | Impossible |
| Platinum | 46 | 0.261 | 0.055 | Difficult | Impossible |
| Silicon carbide | 56 | 0.356 | 0.050 | Difficult | Impossible |

Secondly, there is carried out a test for comparing a surface contour made by forming a Ni layer on a base material of a cemented carbide and cutting the surface into a die shape with a surface contour made by forming an Ir-W alloy layer on a cemented carbide and grinding the surface into a die shape. The base materials are preliminarily machined into a shape approximated to concave shape of 42 mm in diameter and 18.3 mm in radius of curvature.

The result is shown in Table 7.

TABLE 7

| Machining surface number | Ni/Cemented carbide | | Ir—W/Cemented carbide | |
|---|---|---|---|---|
| | P—V | RMS | P—V | RMS |
| 1 | 0.120 | 0.120 | 0.219 | 0.037 |
| 2 | 0.142 | 0.011 | 0.329 | 0.054 |
| 3 | 0.126 | 0.009 | 0.369 | 0.071 |
| 4 | 0.172 | 0.015 | 1.001 | 0.098 |
| 5 | 0.103 | 0.010 | Impossible | |
| 6 | 0.119 | 0.017 | Impossible | |
| 7 | 0.122 | 0.011 | Impossible | |
| 8 | 0.131 | 0.013 | Impossible | |
| 9 | 0.145 | 0.010 | Impossible | |
| 10 | 0.127 | 0.011 | Impossible | |
| 11 | 0.111 | 0.009 | Impossible | |
| 12 | 0.156 | 0.014 | Impossible | |
| 13 | 0.123 | 0.012 | Impossible | |
| 14 | 0.134 | 0.016 | Impossible | |
| 15 | 0.129 | 0.012 | Impossible | |

In the case of machining the Ni surface, there is obtained high precise surface shape and there is no abrasion of the diamond grinding, thereby it is possible to make many press-molding surfaces. On the other hand, in the case of machining the Ir-W alloy film surface, the more the number of machining operation, the worse the machining precision. In the fifth die, it can not be machined, although only the first die satisfies a desired precision.

Apparent from the Tables 6 and 7, it is confirmed that in the case of using Ni metal, Ni-P alloy and Ni-B alloy as the intermediate layer of the press-molding die, there are obtained good machinability and long working life of diamond bite caused by no abrasion.

Further, the machining time can be further shortened in comparison with any other materials.

Therefore, it is apparent that even in the case of a larger diameter die, a lot of press-molding dies can be machined with high precision. On cutting operation, radius of machining edge of diamond bite comes to be small in comparison with grinding operation, so that it is possible to machine a die having a smaller radius of curvature and thus the applied field becomes larger.

In the above embodiment, there are shown the dies comprising an intermediate layer made of Ni metal, Ni-P alloy and Ni-B alloy. However, an intermediate layer mainly composed of Ni-P alloy or Ni-B alloy may be used and provides same effect as long as it is stable chemically because of high melting point and excellent in machinability.

Embodiment 4

FIG. 6 is a step diagram of the method for preparing the press-molding die according to a preferred embodiment of the invention.

In the Figure, 1 denotes a base material, 2 denotes an intermediate layer and 3 denotes a protective coat.

Figure 6A:
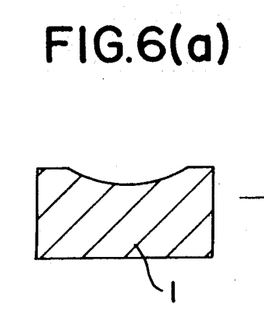

As shown in FIG. 6(a), a cemented carbide and a cermet material having 30 mm in diameter and 6 mm in thickness are used as a base material and are roughly machined by grinding into a shape provided with errors less than 10 μm from a final concave shape of upper and lower molding die having 14 mm in radius of curvature and 20 mm in diameter.

Figure 6B:
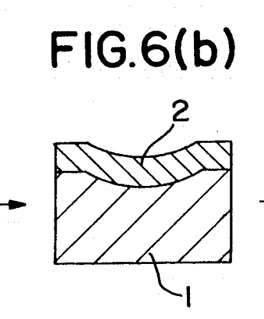

As shown in FIG. 6(b), an intermediate layer made of Ni or mainly composed of Ni-F alloy and Ni-B alloy is formed to 15 μm in thickness as an intermediate layer 2 on the base material 1 by means of ion-plating method.

Figure 6C:
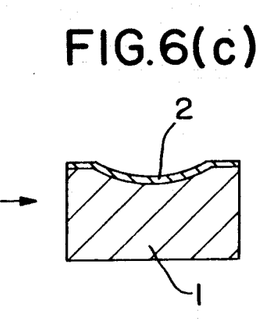

Thereafter, as shown in FIG. 6(c), the intermediate layer 2 is machined by means of diamond bite cutting to make a surface shape with high precision.

Figure 6D:
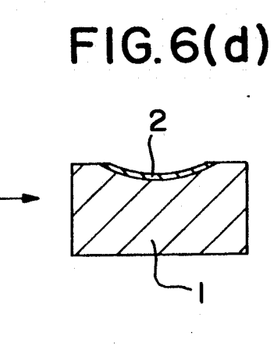

Further, as shown in FIG. 6(d), on the peripheral flange part which is positioned outside the press-molding part, there is removed a part of the intermediate layer 2 by means of grinding or rotary cutting method, preferably by grinding for preventing the diamond bite from being damaged.

Figure 6E:
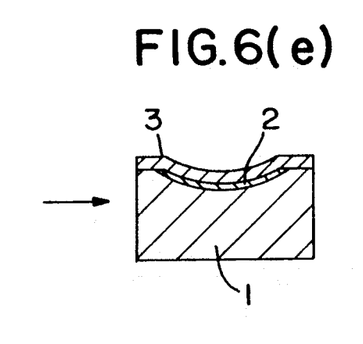

Finally, as shown in FIG. 6(e), there is coated on the remaining intermediate layer of press-molding part 2 and the exposed base material 1 of the peripheral flange part, a surface protective layer 3. The protective layer material may be selected from the group consisting of metal nitride, metal carbide, metal boride, Ir-W alloy, Ru-W alloy, Ir-Ta alloy, Ru-Ta alloy, Ir-Re alloy and Ru-Re alloy.

In all resulting die, there is easily obtained a shape precision (less than RMS 0.04 λ) necessary to produce an optical glass element.

As mentioned above, Arrangement of the intermediate layer easy to be machined by cutting make it unnecessary to machine the very hard base material and make the machining time very much shortened, so that there is prepared at low cost a press-molding die having a high precise surface shape.

Needless to say, the intermediate layer and the protective layer may be formed by means of any other method than sputtering and ion-plating method.

Further, because of removing the peripheral flange part of the intermediate layer on the base material, during primary operation and long use of die there is observed no peeling and cracking on a corner part of the molding die which is caused by stress concentration in the intermediate layer. A pair of the upper and lower press-molding dies are mounted to the press machine shown in FIG. 4.

In a press-molding test, a spherical glass 44 with the radius of 10 mm composed of 70 wt. % of lead oxide (PbO), 27 wt. % of silica (SiO) and the rest of traces is heated in a preheater and put on the lower die 45 kept at 550° C.

The spherical glass 44 is pressed by the upper die 43 in $N_2$ atmosphere with a pressing pressure of 5 kg/mm$^2$ to be deformed. Thereafter, the upper and lower die and the deformed glass are cooled to 380° C. and then the press-molded glass lens is taken out of the die.

After repeating this process 5,000 times, the lower and upper dies are dismounted from the press-molding machine, and the surface shape precision and the surface roughness are measured and evaluated. The result is shown in Table 8. In the Table, mark o indicates no peeling and no change of the die shape.

TABLE 8

|  | Intermediate layer | | |
| --- | --- | --- | --- |
| Protective coat | Nickle | Ni—P | Ni—B |
| Titanium carbide | o | o | o |
| Zirconium carbide | o | o | o |
| Hafnium carbide | o | o | o |
| Tantalum carbide | o | o | o |
| Chromium carbide | o | o | o |
| Niobium carbide | o | o | o |
| Titanium nitride | o | o | o |
| Zirconium nitride | o | o | o |
| Hafnium nitride | o | o | o |
| Tantalum nitride | o | o | o |
| Chromium nitride | o | o | o |
| Niobium nitride | o | o | o |
| Titanium boride | o | o | o |
| Zirconium boride | o | o | o |
| Hafnium boride | o | o | o |
| Tantalum boride | o | o | o |
| Chromium boride | o | o | o |
| Niobium boride | o | o | o |
| Ir—W alloy | o | o | o |
| Ru—W alloy | o | o | o |
| Ir—Ta alloy | o | o | o |
| Ru—Ta alloy | o | o | o |
| Ir—Re alloy | o | o | o |
| Ru—Re alloy | o | o | o |

In all the dies, no surface roughness and no change of the shape is observed. Adhesion between the base material and the intermediate layer and between the base material and the protective layer is good and no peeled part is observed even after repeating of press-molding.

Any protective layer is not reacted with the glass. Further, all the press-molded optical glass elements have a good inverted shape and satisfy fully the required performance.

Thus, the dies according to Embodiment 3, even during use of repeating more than 5,000 times as well as during the initial use, there is maintained a good condition without peeling and cracking and further long time use is realized as the press-molding die for the optical glass element.

As described above, according to this invention, by using a material excellent in heat resistance, heat shock resistance and strength at high temperature as the base material, roughly machining the base material, forming an intermediate layer excellent in cutting and grinding machinability on the roughly machined base material, precisely machining the intermediate layer, and finally forming, as a surface protective layer, a metal thin film comprising at least one of Pt, Pd, Ir, Rh, Os, Ru, Re, W and Ta, being resistant to heat and excellent in mechanical strength, not reacting with glass even at high temperature, the manufacturing time and cost of the die are extremely reduced, and optical elements with high precision can be mass-produced at low cost by press-molding using the die.

Furthermore, by inserting a thin film for enhancing the adhesion between the base material and the intermediate layer, the die life is extremely extended.

In the foregoing embodiments, the surface protective layer was either Ir-Ru-Ta or Pt-Rh-Re-W alloy thin film, but the same effects will be obtained by using any other metal thin film comprising at least one member selected from the group consisting of Pt, Pd, Ir, Rh, Os, Ru, Re, W and Ta.

In Embodiment 2, meanwhile, only the Ni-Co alloy thin film was presented as the film for enhancing the adhesion, but any other material may be used as for as effective to enhance the adhesion between the base material and the intermediate layer.

The embodiments related to the fabrication method of aspherical glass lens, but, needless to say, optical elements in any other shapes suited to machining, such as diffraction gratings, for example, may be similarly mass-produced easily by press-molding using the press-molding die of the invention.

What is claimed is:

1. A die for press-molding an optical element, comprising: a base material made of a material excellent in heat resistance, heat shock resistance and strength at high temperature; an intermediate layer made of a Ni-P alloy or Ni-B alloy thin film excellent in grinding machinability and cutting machinability, formed on the base material; and a surface protective layer made of a metal thin film excellent in heat resistance and strength at high temperature and less reactive to a material of the optical element, formed on the intermediate layer.

2. The die of claim 1, wherein the base material comprises a cemented carbide mainly composed of WC or a cermet mainly composed of TiN, TiC, $Al_2O_3$ or $Cr_3C_2$.

3. The die of claim 1, wherein the surface protective layer is a metal thin film comprising at least one member selected from the group consisting of Pt, Pd, Ir, Rh, Os, Ru, Re, W and Ta.

4. The die of claim 1, wherein the intermediate layer is a Ni-P alloy or Ni-B alloy thin film with a Ni content of 90 wt.% more or less.

5. A method of press-molding an optical element with a pair of dies by heating and pressing a material of the optical element between the pair of dies, wherein each of the dies comprises: a base material made of a material excellent in heat resistance, heat shock resistance and strength at high temperature an intermediate layer made of a Ni-P alloy or Ni-B alloy thin film excellent in grinding machinability and cutting machinability, formed on the base material; and a surface protective layer made of a metal thin film excellent in heat resistance and strength at high temperature and less reactive to the material of the optical element, formed on the intermediate layer.

6. A die for press-molding an optical element, comprising: a base material made of a material excellent in heat resistance, heat impact resistance and strength at high temperature; a thin film formed on the base material for enhancing adhesion strength between the base material and an intermediate layer formed on the thin film; said intermediate layer made of a Ni, Cu, Au, Pt, Pt-Au, Pt-Cu, Pt-Ni, Ni-P or Ni-B alloy thin film excellent in grinding machinability and cutting machinability; and a surface protective layer made of a metal thin film excellent in heat resistance and strength at high temperature and less reactive to a material of the optical element, formed on the intermediate layer.

7. The die of claim 6, wherein the base material comprises a cemented carbide mainly composed of WC or a cermet mainly composed of TiN, TiC, $Al_2O_3$ or $Cr_3C_2$.

8. The die of claim 6, wherein the thin film for enhancing the adhesion strength between the base material and the intermediate layer comprises a metal, carbide, nitride or oxide thin film.

9. The die of claim 6, wherein the surface protective layer is a metal thin film comprising at least one member selected from the group consisting of Pt, Pd, Ir, Rh, Os, Ru, Re, W and Ta.

10. The die of claim 6, wherein the intermediate layer comprises a Pt-Au alloy, Pt-Cu alloy or Pt-Ni alloy thin film with a Pt content of 60 wt.% or less.

11. The die of claim 6, wherein the intermediate layer comprises a Ni-P alloy or Ni-B alloy thin film with a Ni content of 90 wt.% more or less.

12. A method of press-molding an optical element with a pair of dies by heating and pressing a material of the optical element between the pair of dies, wherein each of the dies comprises: a base material made of a material excellent in heat resistance, heat shock resistance and strength at high temperature; a thin film formed on the base material for enhancing adhesion strength between the base material and an intermediate layer formed on the thin film; the intermediate layer made of a Ni, Cu, Au, Pt, Pt-Au, Pt-Cu, Pt-Ni, Ni-P or Ni-P or Ni-B alloy thin film excellent in grinding machinability and cutting machinability; and a surface protective layer made of a metal thin film excellent in heat resistance and strength at high temperature and less reactive to the material of the optical element, formed on the intermediate layer.

13. A die for press-molding an optical element, provided with a press-molding part and a peripheral flange part which is positioned on the outside of the press-molding part, comprising: a base material made of a material excellent in heat resistance, heat impact resistance and strength at high temperature; an intermediate layer made of a Ni, Cu, Au, Pt, Pt-Au, Pt-Cu, Pt-Ni, Ni-P or Ni-B alloy thin film excellent in grinding machinability and cutting machinability, formed on the press-molding part of the base materials; and a surface protective layer made of a metal thin film excellent in heat resistance and strength at high temperature and less reactive to a material of the optical element, formed on the press-molding part of the intermediate layer and the peripheral flange part of the base material.

14. The die of claim 13, wherein the base material comprises a cemented carbide mainly composed of WC or a cermet mainly composed of TiN, TiC, $Al_2O_3$ or $Cr_3C_2$.

15. The die of claim 13, wherein the surface protective layer is a metal thin film comprising at least one member selected from the group consisting of Pt, Pd, Ir, Rh, Os, Ru, Re, W and Ta.

16. The die of claim 15, wherein the surface protective layer is a metal thin film mainly composed of a Ir-W alloy, a Ru-W alloy, a Ir-Ta alloy, a Ru-W alloy, a Ir-Ta alloy, a Ru-Ta alloy, a Ir-Re alloy or Ru-Re alloy.

17. The die of claim 13, wherein the surface protective layer is a metal thin film comprising a metal nitride, a metal carbide or a metal boride.

18. The die of claim 13, wherein the intermediate layer comprises a Pt-Au alloy, Pt-Cu alloy or Pt-Ni alloy thin film with a Pt content of 60 wt.% or less.

19. The die of claim 13, wherein the intermediate layer comprises a Ni metal, Ni-P alloy or Ni-B alloy thin film or a thin film mainly composed of Ni-P alloy or Ni-B alloy.

20. A method for preparing a die for press-molding an optical element, provided with a press-molding part and a peripheral flange part which is positioned on the outside of the press-molding part, comprising the following step;
  (a) roughly machining a base material made of a material excellent in heat resistance, heat impact resistance and strength at high temperature into a shape approximated to the desired shape of the die;
  (b) forming an intermediate thin layer made of a Ni, Cu, Au, Pt, Pt-Au, Pt-Cu, Pt-Ni, Ni-P or Ni-B alloy excellent in grinding machinability and cutting machinability on the base materials;
  (c) precisely machining the intermediate layer into a desired shape of the die;
  (d) removing the peripheral flange part of the intermediate layer at the same time of the step (c) or thereafter;
  (e) forming a surface protective layer made of a metal thin film excellent in heat resistance and strength at high temperature and less reactive to a material of the optical element, on the press-molding part of the intermediate layer and the peripheral flange part of the base material in an uniform manner not to deform the desired shape precision.

21. The method of claim 20, wherein the base material comprises a cemented carbide mainly composed of WC or a cermet mainly composed of TiN, TiC, $Al_2O_3$ or $Cr_3C_2$.

22. The method of claim 20, wherein the surface protective layer is a metal thin film comprising at least one member selected from the group consisting of Pt, Pd, Ir, Rh, Os, Ru, Re, W and Ta.

23. The method of claim 22, wherein the surface protective layer is a metal thin film mainly composed of a Ir-W alloy, a Ru-W alloy, a Ir-Ta alloy, a Ru-W alloy, a Ir-Ta alloy, a Ru-Ta alloy, a Ir-Re alloy or Ru-Re alloy.

24. The method of claim 20, wherein the surface protective layer is a metal thin film comprising a metal nitride, a metal carbide or a metal boride.

25. The method of claim 20, wherein the intermediate layer comprises a Pt-Au alloy, Pt-Cu alloy or Pt-Ni alloy thin film with a Pt content of 60 wt.% or less.

26. The method of claim 20, wherein the intermediate layer comprises a Ni metal, Ni-P alloy or Ni-B alloy thin film or a thin film mainly composed of Ni-P alloy or Ni-B alloy.

* * * * *